Aug. 29, 1961                E. STUMP                2,998,264
PNEUMATIC SPRING SYSTEM FOR HEAVY-DUTY MOTOR VEHICLES
Filed Sept. 16, 1957                              2 Sheets-Sheet 1
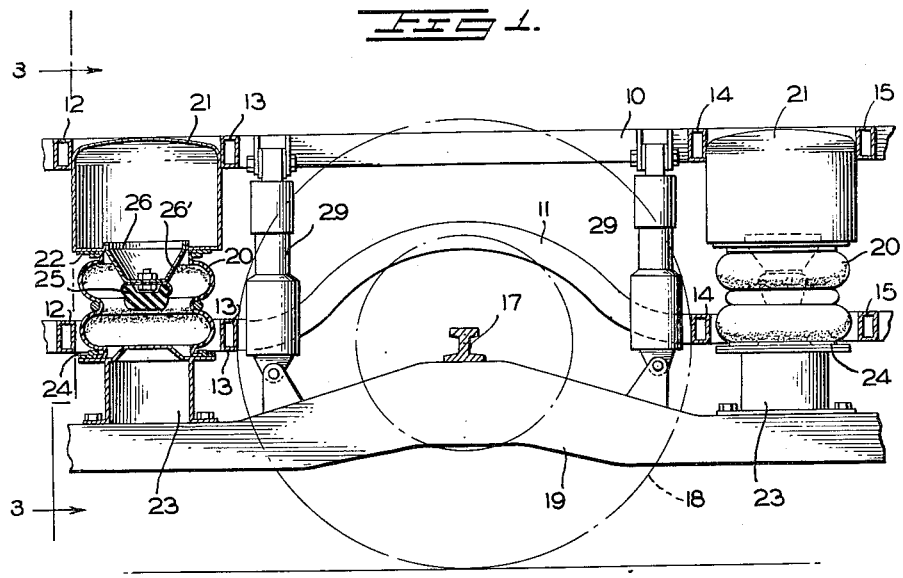
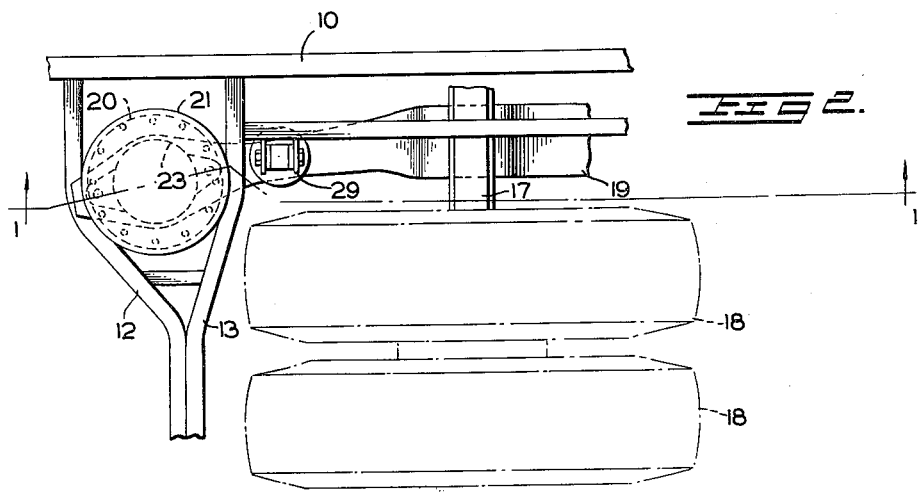
INVENTOR
EUGEN STUMP
BY *Dieke and Gray*
ATTORNEYS

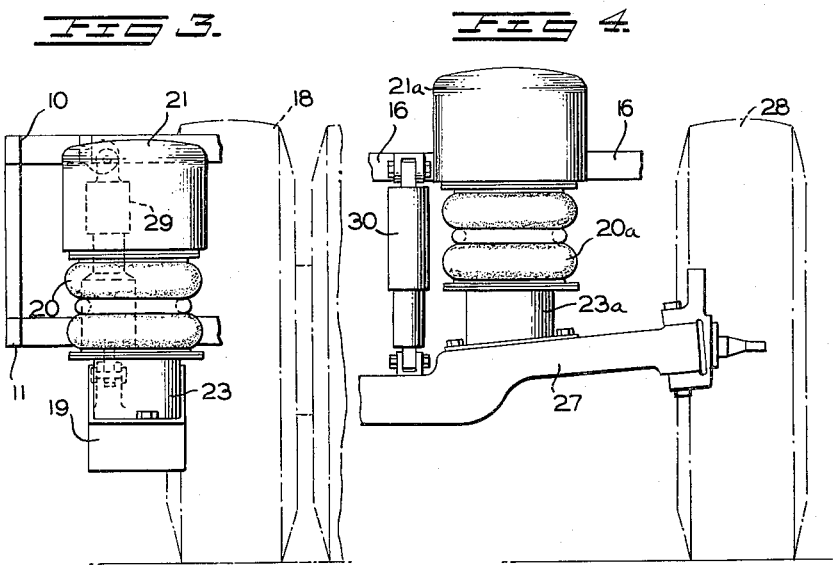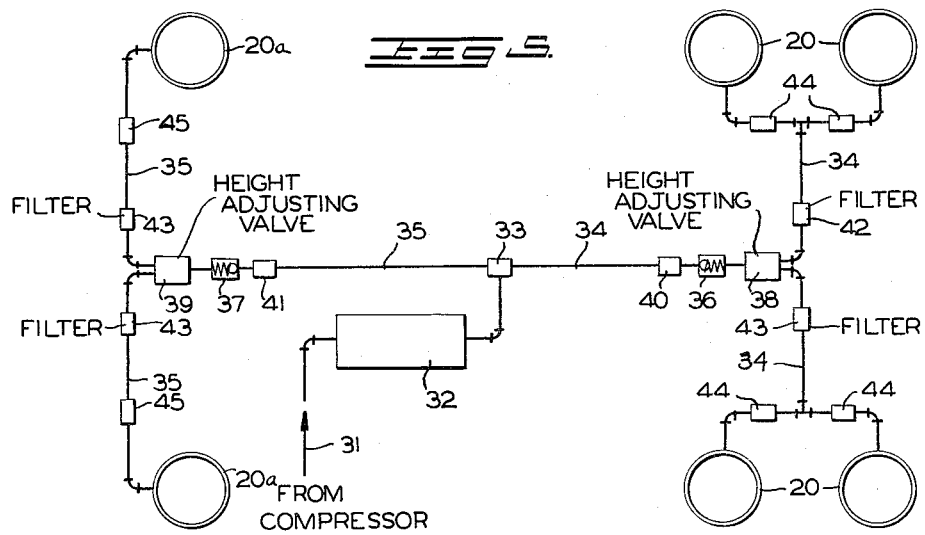

United States Patent Office 2,998,264
Patented Aug. 29, 1961

2,998,264
PNEUMATIC SPRING SYSTEM FOR HEAVY-DUTY MOTOR VEHICLES

Eugen Stump, Stuttgart-Unterturkheim, Germany, assignor to Daimler-Benz Aktiengesellschaft, Stuttgart-Unterturkheim, Germany
Filed Sept. 16, 1957, Ser. No. 684,007
Claims priority, application Germany Sept. 19, 1956
7 Claims. (Cl. 280—124)

The present invention relates to a pneumatic spring system for motor vehicles, and more particularly to a pneumatic spring system especially suited for heavy-duty motor vehicles, such as trucks, buses or the like.

Pneumatic spring systems are known in the prior art in which a rubber bellows serves as spring element which is in communication with an air tank or reservoir, whereby a compressor, for example, which simultaneously supplies pressurized air to the pneumatic brake system continuously supplies air to the air tank and therewith continuously maintains also an air pressure in the pneumatic spring system which pressure is adjustable depending on the particular demand and requirement. In these installations of the prior art, separate air tanks or reservoirs are provided which additionally increase the weight of the vehicle.

The present invention aims at an improvement of the known prior art pneumatic spring systems, especially for heavy-duty motor vehicles, such as trucks, buses or the like, and consists therein that the air tank or reservoir is inserted or interconnected as a force-transmitting part between the pneumatic spring system and the frame, or itself forms a part of the vehicle frame structure. The air tank or reservoir in accordance with the present invention thereby may simultaneously serve for purposes of reinforcing the frame so that additional reinforcing members for achieving an equally rigid frame may be dispensed with. Moreover, under certain circumstances separate air tanks or reservoirs may be avoided altogether. Preferably, the air tank or reservoir is arranged between the outwardly converging V-shaped ends of a cross bearer member whereby a significant saving in space is made possible.

With two or more pneumatic springs per each vehicle axle and vehicle side, a separate air tank or reservoir is preferably coordinated to each pneumatic spring. From such a construction is derived the advantage that the air volume of each pneumatic spring used for the spring movements, for example, within a spring bellows, may be directly increased by the air reservoir itself without any interconnected lines. As a result thereof, the spring characteristics of the pneumatic spring system becomes softer. Furthermore, each pneumatic spring may be effective independently of the other spring which is of particular advantage with leaks or during other operating failures.

Accordingly, it is an object of the present invention to provide a pneumatic spring system which is particularly suitable for heavy-duty vehicles such as trucks or buses.

It is still another object of the present invention to provide a pneumatic spring system which minimizes any additional weight for the vehicle necessitated by the pneumatic spring system while at the same time effectively reinforcing the frame of the vehicle.

A still further object of the present invention is the provision of a pneumatic spring system in which a separate air tank or reservoir is coordinated to each pneumatic spring so as to increase the operating safety of the spring system.

These and further objects, features and advantages in accordance with the present invention will become more obvious from the following description when taken in connection with the accompanying drawing, which shows, for purposes of illustration only, one embodiment in accordance with the present invention, and wherein:

FIGURE 1 is a side view, partially in cross section and taken along line 1—1 of FIGURE 2 of a rear axle spring system with pneumatic spring means in accordance with the present invention;

FIGURE 2 is a plan view of FIGURE 1;

FIGURE 3 is a cross-sectional view taken along line 3—3 of FIGURE 1;

FIGURE 4 is a cross-sectional view similar to FIG. 3 of a pneumatic spring system for a front axle; and FIGURE 5 is a schematic diagram of a pneumatic spring system in accordance with the present invention.

Referring now to the drawing, wherein like reference numerals are used throughout the various views to designate like parts, and more particularly to FIGURES 1 to 4, reference numerals 10 and 11 designate the longitudinal side members of the frame which are interconnected by means of cross bearer members 12 and 13 and cross bearer members 14 and 15 at the rear axle (FIGURE 1) and by means of cross bearer means 16 at the front axle (FIGURE 4). The upper and lower longitudinal bearer members 10 and 11 and the cross bearer members thereof, the number of which may be appropriately varied depending upon load demands on the frame, are mutually reinforced in any suitable manner not illustrated in the drawing for reasons of simplicity, for example, by suitable angle irons, reinforcing beams or the like. The lower longitudinal bearer member 11 is offset in a crank-shaped manner above the axle member 17 of the rear wheels 18 so that the axle member 17 may carry out a corresponding spring-stroke movement in the spring direction thereof. A longitudinal yoke member 19 is rigidly secured to the axle member 17 which serves for abutment of a forward and rearward pneumatic spring. The pneumatic springs consist each of a spring bellows 20 which is connected at the upper end thereof with the lower wall of an air tank or reservoir 21 and with the lower end thereof against a mount 23 by means of a ring, one or several clamps 22 and 24, or the like.

The mount 23 is thereby threadably secured to the end of the longitudinal yoke member 19 secured to the axle member 17. For purposes of limiting the spring stroke, a rubber buffer 25 is provided which is arranged on the inside of the spring bellows 20 at the lower wall of the air tank 21. Apertures 26' in the support member 26 carrying the rubber buffer 25 directly connect the interior space of the spring bellows 20 with the interior space of the air tank 21. Each pneumatic spring may thereby be constructed also as disclosed in detail in my copending application, Serial No. 684,006, filed September 16, 1957, and entitled "Pneumatic Spring System for Motor Vehicles."

In accordance with the present invention, the air tank 21 is interconnected as a force-transmitting part between the pneumatic spring 20 and the frame structure of the vehicle. For that purpose, the air tank 21 is constructed as a cylindrical hollow body inserted between the V-shaped, outwardly converging cross bearer members, for example, cross bearer members 12 and 13 (FIGURE 2), which come together at the outer ends thereof, so that the air tank 21 thereby reinforces the two cross bearer members 12 and 13 with respect to each other or effectively may be considered as constituting a part of the cross bearer member assembly. The air tank 21 and the cross bearers 12 and 13 are thereby appropriately secured with each other, for example, by welding. Furthermore, the air tank 21 may also be reinforced against one or several of the longitudinal bearer members of the frame in any suitable manner.

The front axle member 27 with the front wheels 28

(FIGURE 4) is spring supported in a corresponding manner by means of a spring bellows 20a against the frame of the vehicle whereby only a single pneumatic spring 20a is provided per wheel 28, which abuts directly against the front axle 27 over mount 23a. The air tank 21a may thereby be inserted between the cross bearer members 16 which are arranged in a manner similar to the cross bearers 12 and 13 at the rear axle and may thereby be mutually interconnected, for example, may be welded thereto.

For purposes of absorbing shocks, shock absorbers 29 and 30 may be arranged at the front and rear axle members 27 and 17, respectively.

FIGURE 5 shows, for purposes of illustration, a schematic diagram of the spring system in accordance with the present invention, whereby, corresponding to the embodiment described hereinabove, two pneumatic springs 20 are provided at the rear axle whereas at the front axle only one pneumatic spring 20a is provided per each wheel axle and vehicle side.

Each of the pneumatic springs 20 and 20a with a respective air tank 21 or 21a, which have not been shown in FIGURE 5 for simplicity's sake, is connected with an air compressor of conventional construction (not shown) of the vehicle which simultaneously supplies, for example, pressurized air to the pneumatic brakes of the vehicle.

The line 31 leading from the compressor discharges into an air pressure tank or reservoir 32 from which, over distributor 33, line 34 leads to the pneumatic rear spring system and line 35 to the pneumatic front spring system. In each of the two lines 33 and 34, a height adjusting valve 38 and 39, respectively, is arranged behind the check valves 36 and 37, respectively, by means of which the air pressure in the pneumatic spring bodies 20 or 20a may be adjusted. Filters 40, 41 and 42, 43 are appropriately provided in front of as well as behind the check valves 36 and 37 and height adjusting valves 38 and 39. Possibly, separate closure valves 44 and 45 may be arranged in the lines 34 and 35 leading to the pneumatic springs 20 and 20a or to the air tank 21 and 21a thereof which are directly connected with springs 20 and 20a, which closure valves 44 and 45 make it possible to turn off one or the other pneumatic spring together with the respective air tank independently of the remaining system.

While I have shown and described one preferred embodiment of a pneumatic spring system in accordance with the present invention, it is understood that the same is not limited thereto but is susceptible of many changes and modifications within the spirit of the present invention, for example, by varying the number and arrangement of the pneumatic pumps per wheel axle, and I intend to cover all such changes and modifications as encompassed by the appended claims.

I claim:

1. A pneumatic spring system for vehicles having a frame and axle means, comprising pneumatic spring means between said frame and said axle means including chamber-like air tank means and chamber-like elastic bellows means supported by said air tank means and communicating therewith by means of at least one restricted orifice, said frame including at least one longitudinal side frame member and at least two cross bearer members rigidly connected with said longitudinal side frame member and secured to each other at the free ends thereof, said air tank means being located in the space formed between said cross bearer members and said side frame member and being rigidly connected along the circumference thereof with both of said cross bearer members in reinforcing relationship therewith to thereby constitute a force-transmitting part between said frame and said elastic bellows means.

2. A pneumatic spring system according to claim 1, wherein said vehicle has a front and a rear axle, said system including two pneumatic spring means for each rear axle per vehicle and one pneumatic spring means for each front axle per vehicle, and means for supplying air under pressure to each of said pneumatic spring means, means for controlling the individual spring means independently of one another.

3. A pneumatic spring system according to claim 1, wherein said elastic bellows means includes elastic buffer means disposed within said bellows means and supported by said air tank means, abutment means on said axle means disposed within said bellows means for abutment thereof with said buffer means to thereby limit the spring stroke of said axle means.

4. A pneumatic spring for vehicles having a frame and axle means, comprising pneumatic spring means between said frame and said axle means, including chamber-like air tank means and chamber-like elastic bellows means supported by said air tank means and communicating therewith by means of at least one restricted orifice, and means for supplying air under pressure to said pneumatic spring means including a common supply system provided with a common tank, said frame including at least one longitudinal side frame member and at least two cross bearer members rigidly connected with said longitudinal side frame member and secured to each other at the free ends thereof, said air tank means being located in the space formed between said cross bearer members and said side frame member and being rigidly connected along the circumference thereof with both of said cross bearer members in reinforcing relationship therewith to thereby constitue a force-transmitting part between said frame and said elastic bellows means.

5. A pneumatic spring system according to claim 4, further comprising check valve means and height-adjusting valve means operatively connecting said tank means with said common tank.

6. A pneumatic spring system according to claim 5, further comprising filter means arranged in front of said check valve means and behind said height-adjusting valve means.

7. A pneumatic spring system according to claim 6, further comprising means including closure valve means for individually controlling the supply to the individual tank means in response to leakages occurring in that part of the system.

References Cited in the file of this patent

UNITED STATES PATENTS

| 1,414,623 | Church | May 2, 1922 |
| 2,257,913 | Maranville | Oct. 7, 1941 |
| 2,611,627 | Reynolds | Sept. 23, 1952 |
| 2,624,594 | Gouirand | Jan. 6, 1953 |
| 2,663,569 | Gouriand | Dec. 22, 1953 |
| 2,713,498 | Brown | July 19, 1955 |
| 2,787,475 | Jackson | Apr. 2, 1957 |
| 2,917,319 | Axtmann | Dec. 15, 1959 |